United States Patent
Manuell et al.

(10) Patent No.: US 7,451,336 B2
(45) Date of Patent: Nov. 11, 2008

(54) AUTOMATED LOAD SHEDDING OF POWERED DEVICES IN A COMPUTER COMPLEX IN THE EVENT OF UTILITY INTERRUPTION

(75) Inventors: Jeffrey Donald Manuell, Rochester, MN (US); Michael James Pascoe, Rochester, MN (US); Maureen Faye Peters, Pepin, WI (US)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 10/687,285

(22) Filed: Oct. 16, 2003

(65) Prior Publication Data

US 2005/0086543 A1 Apr. 21, 2005

(51) Int. Cl.
*G06F 1/00* (2006.01)
(52) U.S. Cl. .................... 713/324; 713/320; 714/14
(58) Field of Classification Search ................ 713/300, 713/320, 324; 714/13, 14
See application file for complete search history.

(56) References Cited

U.S. PATENT DOCUMENTS

| | | | | |
|---|---|---|---|---|
| 4,611,289 A | * | 9/1986 | Coppola | 713/300 |
| 5,315,161 A | * | 5/1994 | Robinson et al. | 307/66 |
| 5,319,571 A | * | 6/1994 | Langer et al. | 713/300 |
| 5,381,554 A | * | 1/1995 | Langer et al. | 714/14 |
| 5,717,934 A | * | 2/1998 | Pitt et al. | 713/330 |
| 5,949,974 A | * | 9/1999 | Ewing et al. | 709/202 |
| 6,304,981 B1 | * | 10/2001 | Spears et al. | 714/24 |
| 6,629,247 B1 | * | 9/2003 | Hall et al. | 713/300 |
| 6,865,685 B2 | * | 3/2005 | Hammond et al. | 713/340 |
| 6,904,534 B2 | * | 6/2005 | Koenen | 713/323 |
| 6,986,069 B2 | * | 1/2006 | Oehler et al. | 713/320 |
| 6,990,593 B2 | * | 1/2006 | Nakagawa | 713/300 |
| 7,043,647 B2 | * | 5/2006 | Hansen et al. | 713/320 |
| 2003/0023885 A1 | * | 1/2003 | Potter et al. | 713/300 |
| 2003/0065958 A1 | * | 4/2003 | Hansen et al. | 713/300 |
| 2004/0163001 A1 | * | 8/2004 | Bodas | 713/300 |

* cited by examiner

*Primary Examiner*—Chun Cao
(74) *Attorney, Agent, or Firm*—James R. Nock

(57) ABSTRACT

The present invention provides a method, apparatus and computer-readable program for providing management of a computing complex during a utility interruption. More specifically, the present invention provides an automated method, apparatus and computer-readable program to manage the selected power down of devices within an information technology computing complex when the loss of conventional utility service occurs. This invention selectively shuts down systems/devices within the computing complex based on the criticality of the systems/devices and the current state of environment parameters (e.g., battery reserve level, temperature, time, etc.) monitored within the computing complex.

21 Claims, 10 Drawing Sheets

AUTOMATED LOAD SHEDDING OF POWERED DEVICES IN A COMPUTER COMPLEX IN THE EVENT OF UTILITY INTERRUPTION

FIELD OF THE INVENTION

The present invention relates generally to management of a computer complex, and more specifically to the automated load shedding of powered devices in a computer complex, when the complex is operating under emergency power from an uninterruptible power supply.

BACKGROUND OF THE INVENTION

Sophisticated, critical electronic systems require power supplies having the attributes of very high quality and reliability. These attributes are not always available from the power supplied through typical utility organizations. Unforeseen natural events, such as storms, earthquakes or other natural disasters can unexpectedly disrupt the normal flow of electricity to installations such as computing complexes (i.e., information technology data centers). Power interruptions may also occur from man-made occurrences. A recent, large-scale failure of a major portion of the power grid in the Northeastern portion of the United States underscores the vulnerability of computing complexes to massive power disruptions, both natural and man-made.

Uninterruptible Power Supply (UPS) systems are power conversion systems that are commonly used to provide conditioned, reliable power for devices and systems such as computing complexes, telecommunications networks, medical equipment and the like. UPS systems can provide temporary power to the devices and systems within such complexes so that the devices and systems can continue to operate despite the loss of the primary power source and thereby can reduce the likelihood that valuable data may be lost.

UPS systems may provide uninterrupted power by switching from a primary power source (e.g., electrical utility supplied power) to a secondary power source (e.g., UPS supplied battery power) if loss of the primary power source is detected. When the primary power source is restored, the UPS system may switch from the secondary power source back to the primary power source. Similarly, the UPS system may switch from the primary power source to the secondary power source if the UPS system determines that the primary power source is inappropriate. For example, if a voltage level of the primary power source is less than a minimum acceptable level, the UPS system may provide uninterrupted power by switching from the primary power source to the secondary power source.

While UPS systems provide a temporary solution to the loss of primary/conventional power (e.g., utility generated power) within a computing complex, the amount of battery power available from UPS systems is finite. Thus, if a disruption occurs to the conventional power source, the IT administrator is faced with a decision as to when (or even if) to power down devices within the computing complex.

If the IT administrator shuts down all computing resources as soon as the UPS goes on battery, the administrator protects the systems and their associated storage devices from damage and data loss, but risks significant downtime to critical systems/devices if the conventional power source is quickly restored. If the IT administrator waits to shut down all systems/devices within the computing complex only after a low battery alarm is received from the UPS, the administrator keeps critical systems/devices up for a longer period of time, but risks not being able to successfully power down all systems/devices within the computing complex before the UPS battery is exhausted. In another instance, the IT administrator may have high confidence that the conventional power resource will be restored before the UPS battery is exhausted, and choose to not power down any systems/devices within the computing complex. In this instance, the administrator risks a severe loss of data/equipment if the UPS battery completely drains before conventional power is restored.

There is a need for an automated method to manage the selected shutdown of devices within an information technology computing complex when the loss of conventional utility service occurs. Such a method should selectively shutdown systems/devices within the computing complex based on the criticality of the systems/devices and the current state of backup power resources available within the computing complex.

SUMMARY OF THE INVENTION

The present invention provides a method, apparatus and a computer-readable program for managing a computing complex during a utility interruption.

In a preferred embodiment of the present invention, a method and computer readable program are provided for managing the operation of a computing complex having one or more computer servers during a utility outage. The method/computer-readable program begins by monitoring one or more operating environment parameters within the computing complex. Next, the method/computer-readable program selectively powers down one or more of the computer servers based on: 1) the current state of the operating environment parameters, and 2) the criticality value assigned to each of the one or more computer servers. The operating environment parameters include, but are not limited to: remaining battery operating time of an uninterruptible power supply powering the computing complex, one or more ambient temperature readings within the computing complex, and the current time of day. In a preferred embodiment, the computing complex is powered by one or more battery driven uninterruptible power supplies during the utility outage. The method/computer-readable program may further comprise the step of sending pager text messages to a predetermined set of support personnel based on the current state of the operating environment parameters. Examples of utility outages managed by the method/computer-readable program include, but are not limited to, power failures and cooling failures.

The present invention further provides an apparatus for managing the operation of a computing complex having one or more computer servers during a utility outage. The apparatus includes a set of environment equipment for maintaining the operating environment of the computing complex. The apparatus also includes an environment monitor server coupled to the set of environment equipment for monitoring the current state of one or more operating environment parameters within the computing complex. The apparatus further includes a set of control files for determining a current load shed category for the computing complex. Finally, the apparatus includes a centralized load shedding manager coupled to the environment monitor server and the set of control files. The centralized load shedding manager manages the selective powering down of one or more of the computer servers based on: 1) the current state of the one or more environment parameters, 2) the current load shed category for the computing complex and 3) a criticality value assigned to each of the one or more computer servers.

In a preferred embodiment of the present invention, the set of environment equipment includes at least one of: an uninterruptible power supply (UPS), a power distribution unit (PDU), a static transfer switch (STS), an air handling unit (AHU), and a temperature probe. The operating environment parameters used by the apparatus include, but are not limited to: remaining battery operating time of an uninterruptible power supply powering the computing complex, one or more ambient temperature readings within the computing complex, and the current time of day. In a preferred embodiment, the computing complex is powered by a battery driven uninterruptible power supply during the utility outage. Examples of utility outages managed by the apparatus include, but are not limited to, power failures and cooling failures. The set of control files used within the apparatus include, but are not limited to: a load shedding master table and/or a load shedding pager table. The apparatus may further include one or more pagers coupled to the centralized load shedding manager, wherein the centralized load shedding manager sends pager text messages to the one or more pagers based on the current state of the operating environment parameters. In one embodiment of the present invention, the environment monitoring server is coupled to the centralized load shedding manager by one or more simple network management protocol (SNMP) traps.

Finally, the present invention provides a method for deploying computing infrastructure, comprising integrating computer-readable code into a computing system, wherein the code in combination with the computing system is capable of providing management of the operation of the computer system during a utility outage. The method begins by monitoring one or more operating environment parameters within a computing system. The method next selectively powers down one or more computer servers within the computing system based on the current state of the operating environment parameters and a criticality value assigned to each of the one or more computer servers.

The foregoing and other features and advantages of the invention will be apparent from the following more particular description of preferred embodiments of the invention, as illustrated in the accompanying drawings.

DETAILED DESCRIPTION OF THE PREFERRED EMBODIMENTS

Figure 1:
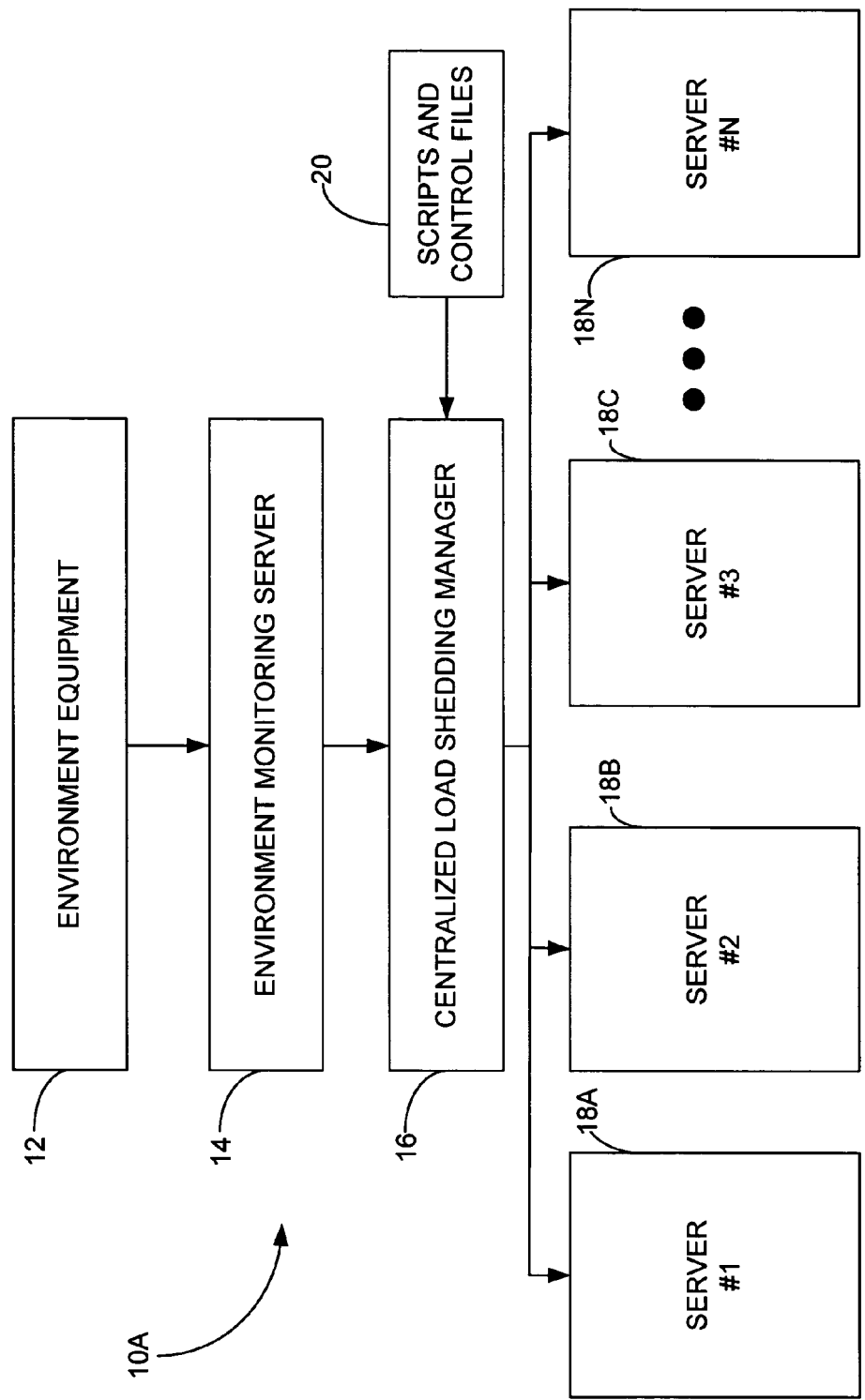
FIG. 1 is a high-level block diagram illustrating an exemplary computing complex in which the present invention operates.

FIG. 1 is a high-level block diagram illustrating an exemplary computing complex in which the present invention operates, shown generally at 10A. The computing complex 10A includes a set of environment equipment 12, which provides the environmental infrastructure to the computing complex. As an example, environment equipment 12 typically includes an uninterruptible power supply (UPS) for providing temporary power to the computing complex 10A in the event of a power outage from a primary power supplier. Environment equipment 12 may also include air handlers and temperature sensors. Further examples of environment equipment 12 are illustrated in FIG. 2.

An environment monitoring server 14 is coupled to environment equipment 12 to continuously monitor the operational status of the environment equipment within the computing complex 10A. More specifically, environment monitoring server 14 includes special alarm handlers for handling alarms generated by the environment equipment 12 when notable events occur within the environment equipment (e.g., the uninterruptible power supply becomes active). A special software application resides on the environment monitoring server 14 to collect and coordinate alarms received from the environment equipment 12.

A centralized load shedding manager 16 is coupled to the environment monitoring server 14. The environment monitoring server 14 provides centralized load shedding manager 16 with the current state of environment parameters (e.g., UPS battery reserve level, ambient temperature, etc.) provided by the environment equipment 12. A set of control files 20 which defines what changes to environment parameter values will change the load shed priority level of the computing complex as a whole is also provided to the centralized load shedding manager 16. The centralized load shedding manager 16 manages the selected shutdown of devices (e.g., computer servers 18A-18N) within the computing complex 10A when the loss of conventional utility service occurs. More specifically, centralized load shedding manager 16 selectively shuts down computer servers 18A-18N within the computing complex 10A based on the criticality of the computer servers, and the current state of the environment parameters, as provided by environment monitoring server 14.

Figure 2:
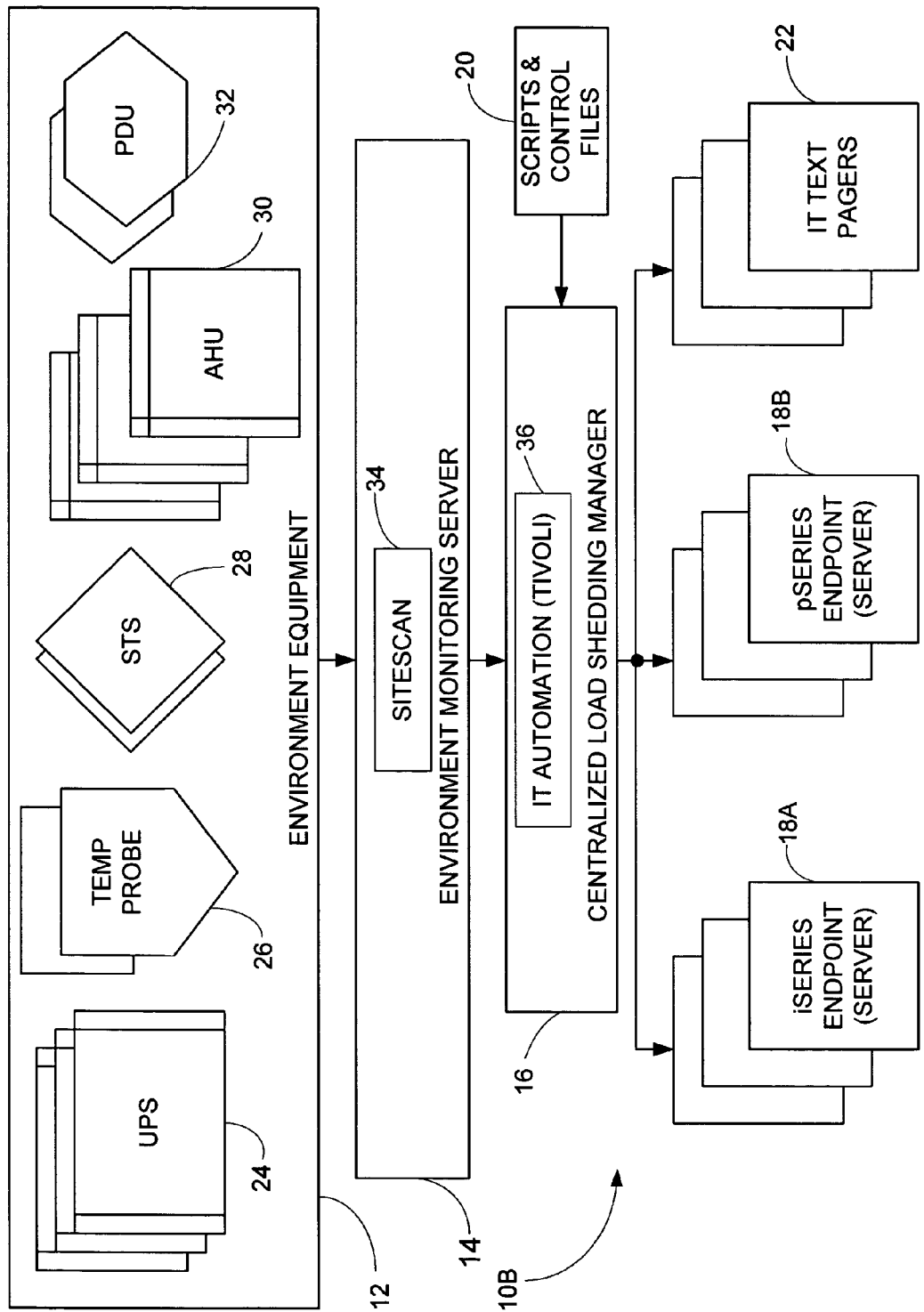
FIG. 2 is a more detailed block diagram of FIG. 1, illustrating an exemplary computing complex in which the present invention operates.

FIG. 2 is a more detailed block diagram of FIG. 1, illustrating an exemplary computing complex in which the present invention operates, shown generally at 10B. In the exemplary embodiment, environment equipment 12 includes at least one uninterruptible power supply (UPS) 24, for providing a secondary, temporary power supply for computing complex 10B in the event of a power failure. In one embodiment of the present invention, twin parallel redundant UPS's 24 operate as a single resource. Environment equipment 12 also includes at least one temperature probe 26 for measuring the ambient temperature within the computing complex 10A. Environment equipment 12 further includes at least one static transfer switch (STS) 28 which allows a power distribution unit 32 to get its power from the UPS 24. One or more air handling units 30 within the environment equipment 12 provide necessary cooling to the computing complex 10B. Power distribution unit 32 distributes power provided by UPS 24 to the variety of computer servers 18A-18N and other ancillary equipment that resides within the computing complex 10A. In the illustrated embodiment, all of the environment equipment is provided by Liebert Corporation, Columbus, Ohio, but similar equipment from a variety of other network power providers may be used, and still remain within the scope and spirit of the present invention. In the illustrated embodiment, the environment equipment 12 is networked using a Liebert Control Module Network.

Each type of environment equipment 12 has a number of parameters describing its current state. Each parameter can generate an alarm when active or when a threshold is reached. For each parameter, a return-to-normal condition also generates a corresponding alarm. Examples of alarms generated within environment equipment 12 include a SiteScan heartbeat alarm which is a hard-wired timer within the Liebert Control Module Network, and a UPS Battery Runtime Remaining Alarm which is an alarm generated when a UPS Battery Discharge Alarm is active.

Environment monitoring server 14 monitors environment equipment 12 for all alarms generated. In the illustrated embodiment, environment monitoring server 14 runs three Liebert software applications, SiteScan 2000, Alert, and SiteTrap which monitor and collect alarms generated by the environment equipment 12. Environment monitoring server 14 then generates one or more simple network management protocol (SNMP) traps with the alarm information, which are passed onto centralized load shedding manager 16.

In a preferred embodiment of the present invention, centralized load shedding manager 16 is an IBM Tivoli software application, which converts the SNMP traps into alarm events, which are subsequently used to selectively control the shutdown of computer servers 18A-18B during a load shedding operation. A set of scripts and control files 20 are provided to centralized load shedding manager 16 in order to assist the software in determining the current load shed priority level for the computing complex 10B. Centralized load shedding manager 16 also generates pager text messages which are sent to a plurality of information technology personnel via their pagers, based on the current state of the operating environment parameters. Centralized load shedding manager 16 also manages alerts for all servers and networks. This creates a single point where all IT and environmental alerts can be managed.

Figure 3:
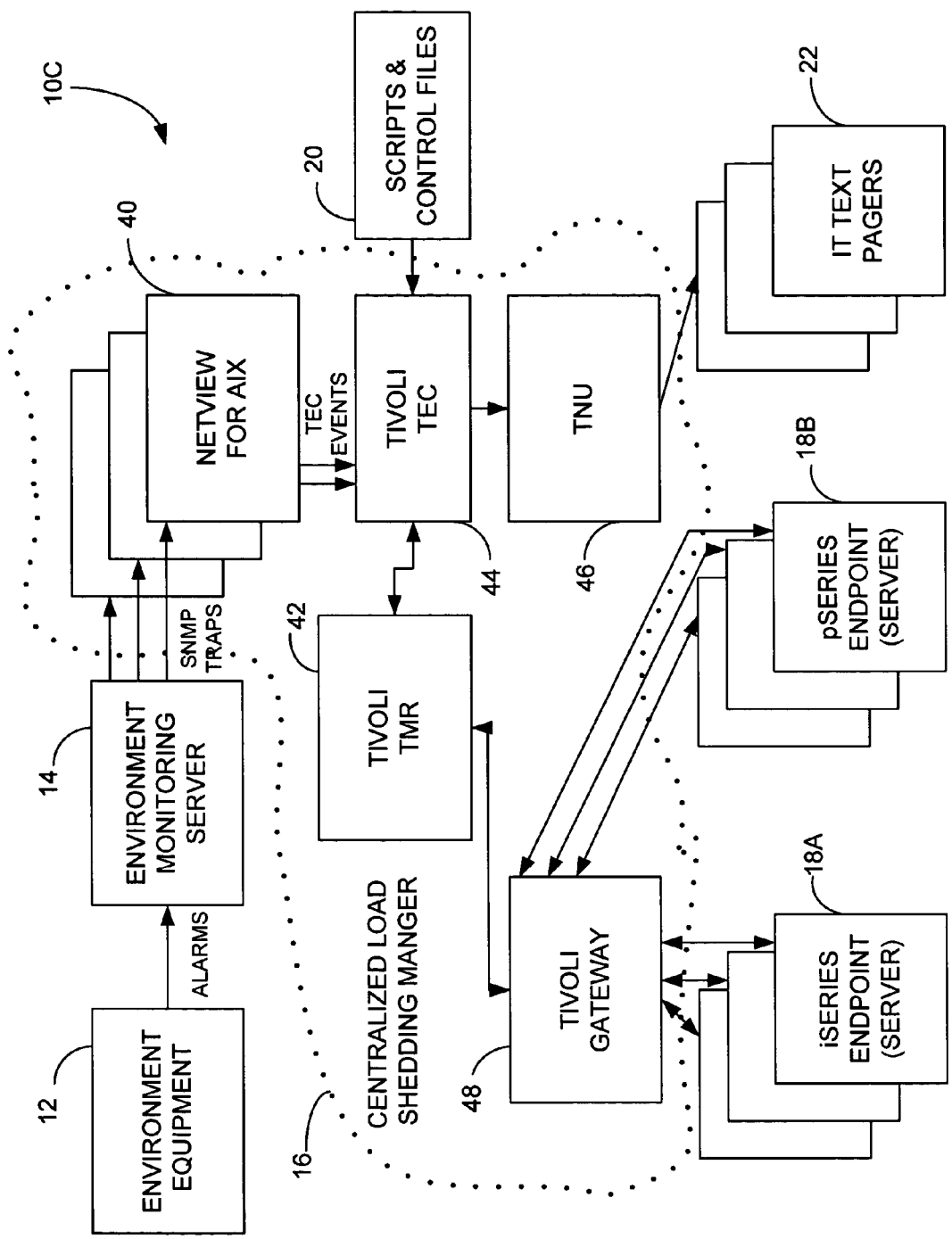
FIG. 3 is another more detailed block diagram of FIG. 1, illustrating the components comprising the centralized load shedding manager in accordance with the present invention.

FIG. 3 is another more detailed block diagram of FIG. 1, illustrating the components comprising the centralized load shedding manager 16 in accordance with the present invention. As previously described in FIGS. 1 and 2, environment equipment 12 passes alarms to environment monitoring server 14, which in turn passes SNMP traps to centralized load shedding manger 16. Centralized load shedding manager 16 includes a Netview for AIX software module 40, which receives and processes the SNMP traps passed from the environment monitoring server 14. This Netview for AIX software module is a Tivoli application which gives a status view of a network. It comes with a function called Tivoli enterprise console (TEC) adapter which takes a data string passed in an SNMP trap and formats it into the event format used by the Tivoli Enterprise Console (TEC) 44.

TEC 44 is a rule-based engine that processes and correlates events received from multiple platforms. In the case of the present invention, a set of custom TEC rules have been created to handle alarm events passed via Netview 40. This rule set includes overall equipment monitoring which generates a text pager message to be sent to facilities personnel with current equipment and load shed status via Tivoli Notification Utility (TNU) 46. This rule set also handles Liebert SiteScan heartbeat alarm events. Detection of a "UPS on battery power" alarm event enables load shedding automation based on server equipment prioritization and the alarm of "UPS battery time remaining", passed via another event. Finally, this custom rule set and set of associated scripts have the ability to accelerate or hold load shedding via manual intervention. In other words, an IT crisis manager can manually control automation based on factors not known to Tivoli, such as which group of customers are currently working, and which are not.

Tivoli Notification Utility (TNU) 46 is called by the rules-based engine of TEC 44 during event processing. Within TNU 46, custom message IDs are created for specific event notifications. Settings within each ID indicate the proper group to send the message to via IT text pagers 22.

Tivoli Managed Region Server (TMR) 32 provides the endpoint manager for directing communications with the endpoint computer servers 18A and 18B. It also shares its Tivoli resources with TEC 44, allowing custom Tivoli tasks to use the communication flow to computer server endpoints 18A and 18B via Tivoli gateway 48.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy drives and CD RW, and transmission type media such as digital and analog communications links.

Figure 4:
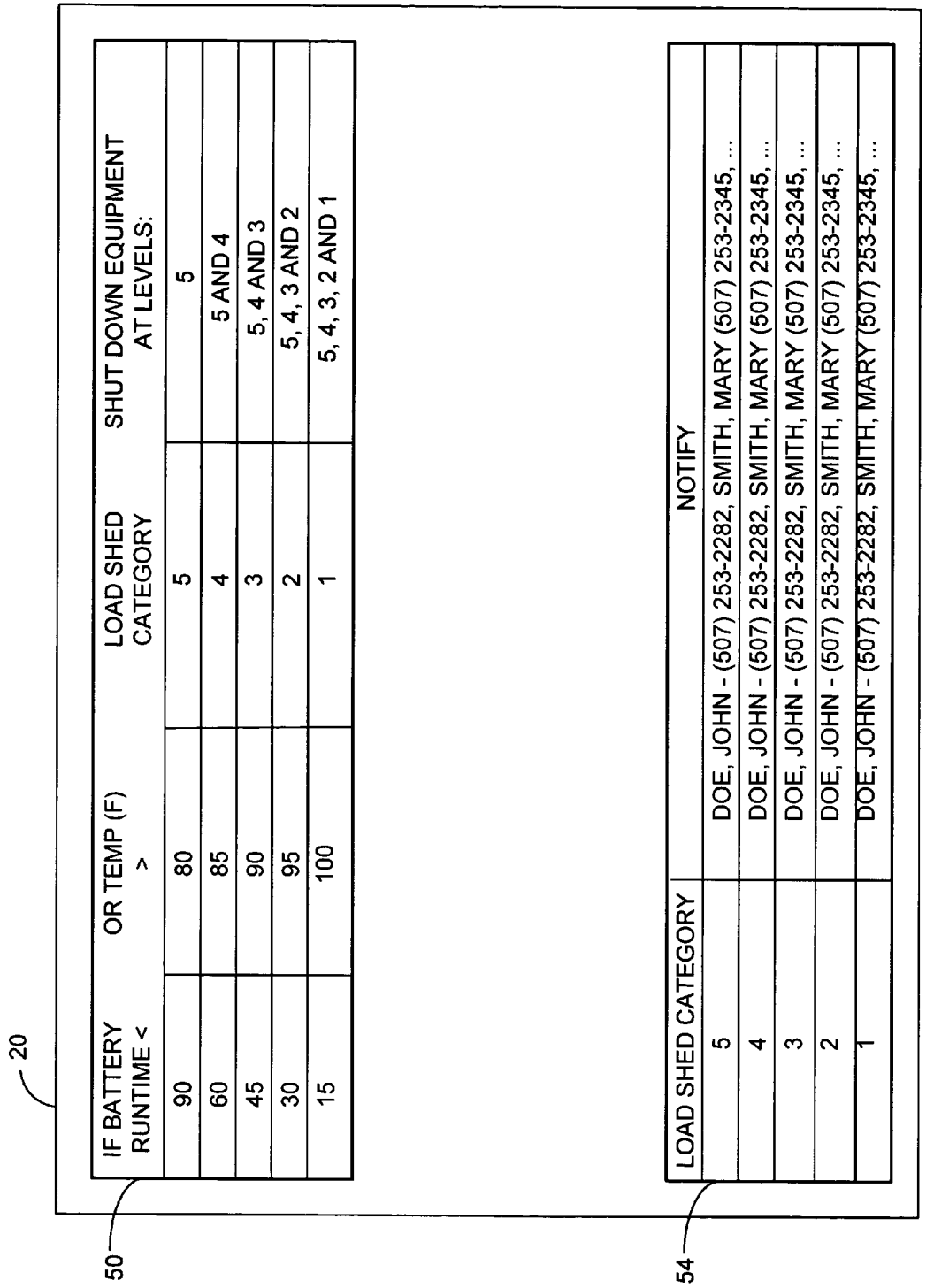
FIG. 4 illustrates two of the control files utilized by the centralized load shedding manager in accordance with the present invention.

FIG. 4 illustrates two of the control files 20 utilized by the centralized load shedding manager 16 in accordance with the present invention. The first of the control files, the load shedding master table 50, describes the operating environment parameter values that will cause a change in load shed priority level for the computing complex. As an example, if either the remaining UPS battery runtime is less than 90 minutes or the ambient temperature within the computing complex is greater than 80 degrees F., the load shed category is set to 5 (the lowest priority level). At level 5, the centralized load shedding manager 16 will begin to shut down computer server resources. If either the remaining UPS battery runtime is less than 60 minutes or the ambient temperature is greater than 85 degrees F., the load shedding category is increased to level 4, and so on. The number of load shed priority categories and the operating environment parameters/parameter values illustrated in FIG. 4 are for illustrative purposes only. The centralized load shedding manager can operate successfully with either a greater or lesser number of load shed priority categories, or different operating environment parameters/parameter values and still remain within the scope and spirit of the present invention. In one such example, the current time of day may be used as an additional operating environment parameter to fine tune the priority levels assigned. For example, if the switch to UPS power occurs during non-peak hours, the computer servers may be shut down on a more aggressive time table.

The second control file 20 is the load shedding pager table 54. This table defines the relationship between a load shed category and the list of IT text pagers to notify when that load shed level is achieved. For example, if the current load shedding category level is "5", support personnel John Doe and Jane Smith are notified of this via their text pagers. While it is possible to customize the notification list for each load shed category level, it is possible that the notification list will be the same for each load shed category. It is also possible that load shedding master table 50 and load shedding pager table 54 may be combined in various ways and still remain within the spirit and scope of the present invention.

Figure 5:
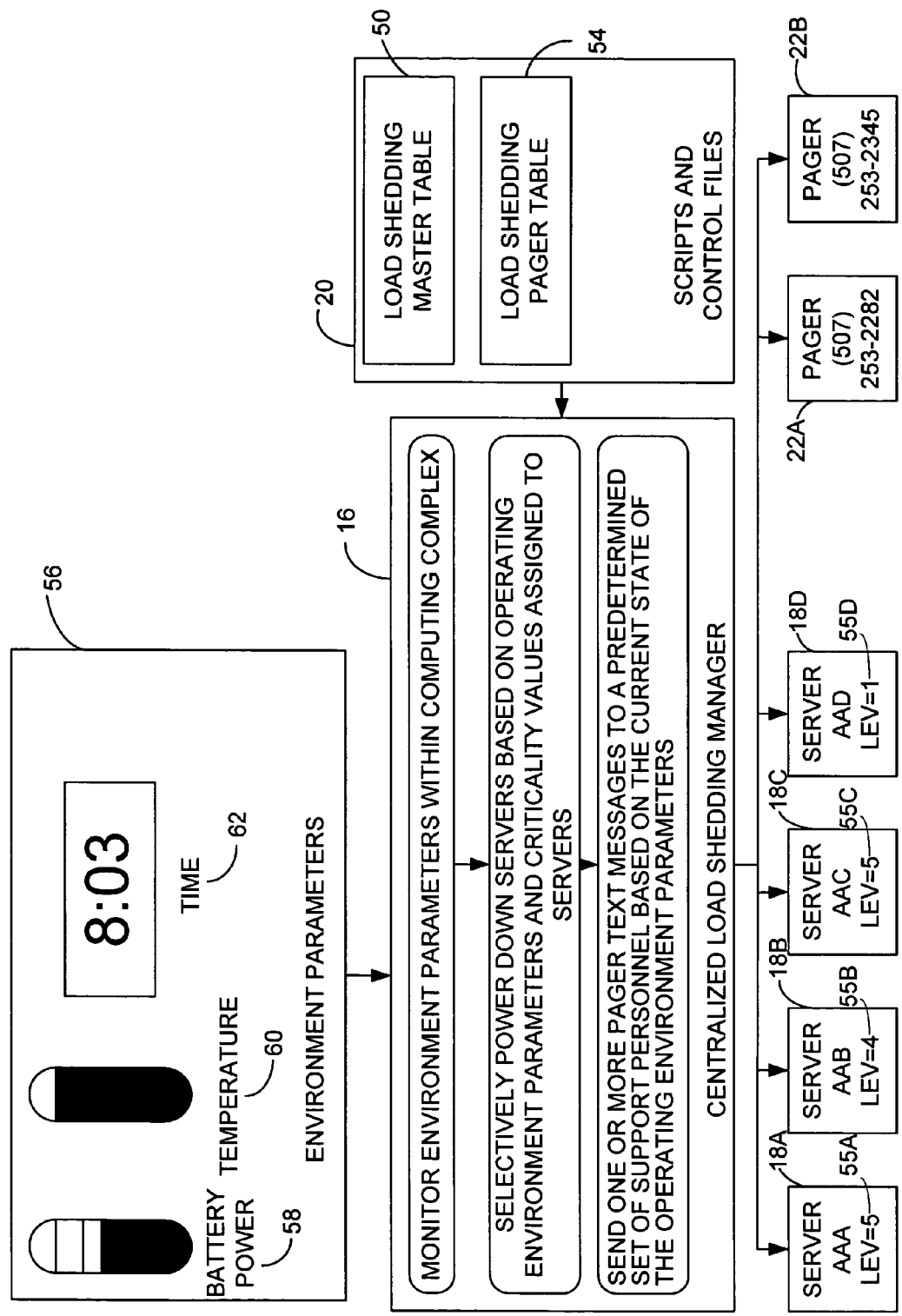
FIG. 5 is a block level diagram illustrating the environment parameters and control files utilized by the centralized load shedding manager to shut down selected servers and send pager messages.

FIG. 5 is a block level diagram illustrating the environment parameters 56 and control files 20 utilized by the centralized load shedding manager 16 to shut down selected servers 18A-18D and send pager messages to text pagers 22A-22B. In the illustrated example, centralized load shedding manager 16 begins by continuously monitoring environment parameters 56 within the computing complex. In the illustrated example, three such parameters include, but are not limited to: current UPS remaining battery power (in minutes) 58, ambient temperature 60, and current time 62.

Next, the centralized load shedding manager 16 selectively powers down servers based on the operating environment parameters 56 and a criticality value assigned to the servers. In a preferred embodiment of the present invention, this assigned criticality value is stored within the server itself, as shown at 55. In an alternative embodiment of the present invention, the criticality value may be defined in a table provided by the control file 20 (not shown). As previously described in FIG. 4, the load shedding master table 50 determines the current load shed category for the computing complex based on current values of the operating environment parameters 56. For example, if the UPS battery power is currently active, the current ambient temperature is 76 degrees F., and 86 minutes of UPS battery capacity remain, the centralized load shedding manager determines that the current load shed category is "5". If any of the servers 18A-18D within the computing complex have an assigned criticality level of "5" (see 55), they will then be shut down by the centralized load shedding manager 16. In the example shown in FIG. 4, Servers "AAA" 18A and "MC" 18C have an assigned criticality level "5", and therefore will be shut down immediately.

In addition to the automated server shut down, centralized load shedding manager 16 may also send one or more pager text message to a predetermined set of support personnel based on the current state of the operating environment parameters (i.e., the current load shed category changes). In the illustrated example, when the centralized load shedding manager 16 determines the computing complex now has a level of "5", it then consults the load shedding pager table 54 in order to determine the list of support personnel that will need to be notified of the new level via pager 22A and 22B. The support personnel may then participate in the load shedding procedure by manually shutting down any equipment unreachable by the automated controls of the centralized load shedding manager 16 (e.g., new servers 18 which have yet to be assigned a criticality value).

FIGS. 6A-6E collectively represent a detailed flow diagram of an exemplary method for managing the operation of a computing complex during a utility interruption in accordance with the present invention, shown generally at 100. The flow diagram deals with both a power failure (see element 102) and a cooling failure (see element 104). The flow diagram includes both automated steps performed by the centralized load shedding manager 16 (generally shown on the left side of the diagram), and also manual steps performed by support personnel and emergency response teams (generally shown on the right half of the diagram).

If a power failure occurs 106, the UPS automatically begins to provide battery power to the computing complex, as shown at block 106. Once UPS battery power begins to flow, the load shed scripts are first invoked, as shown at block 108, and the remaining run time for the UPS battery is monitored, as shown at block 112. The load shed scripts also send a page to support personal via their text pagers that the computing complex is now on battery power, as shown at block 110. After the support personnel receive their pages, they report to work, as shown at block 120. Meanwhile, the remaining run time for the UPS battery is continuously compared to threshold values contained within the load shedding master table 50 to determine if a level 5 condition yet exists. If not, the monitoring continues at block 112. If a level 5 condition exists, processing continues on FIG. 6B at element 118.

If either a power failure 102 or cooling failure 104 is detected, the facilities coordinator contacts site security, as shown at block 122. Site security then contacts the IT manager, as shown at block 124. The IT manager then gathers the emergency response team, as shown at block 126. At block 130, the emergency response team begins to gather relevant information, such as seasonality factors (e.g., what time of the year is it), time of day, and current business factors (are any of the manufacturing lines currently running, how important is it to keep the line running, etc.). This information is gathered and analyzed concurrently with the automated load shedding operation currently underway. Once the necessary information has been gathered, control passes to block 132 on FIG. 6B.

Figure 6A:
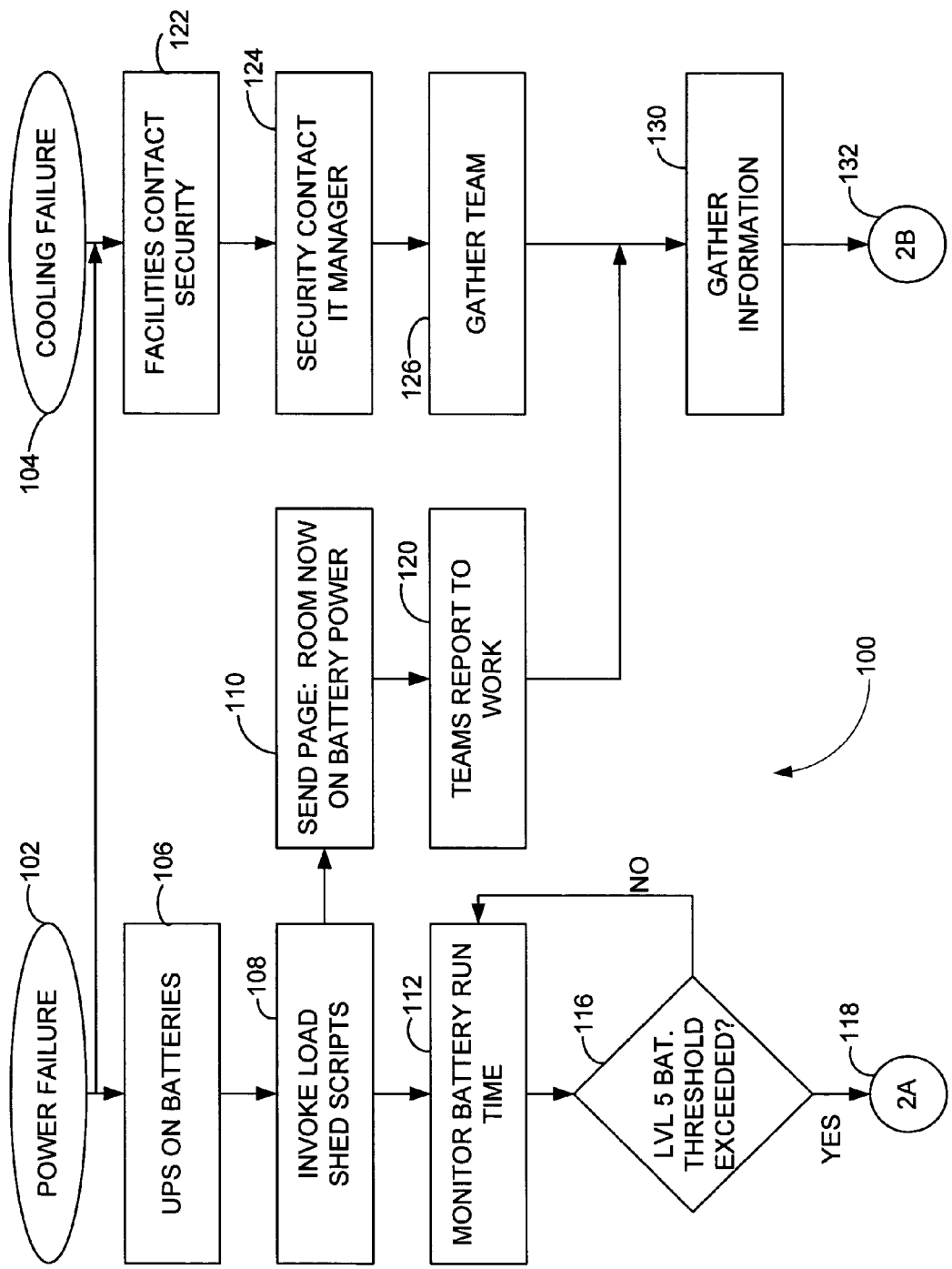
FIGS. 6A-6E collectively represent a detailed flow diagram of an exemplary method for managing the operation of a computing complex during a utility interruption in accordance with the present invention.
Figure 6B:
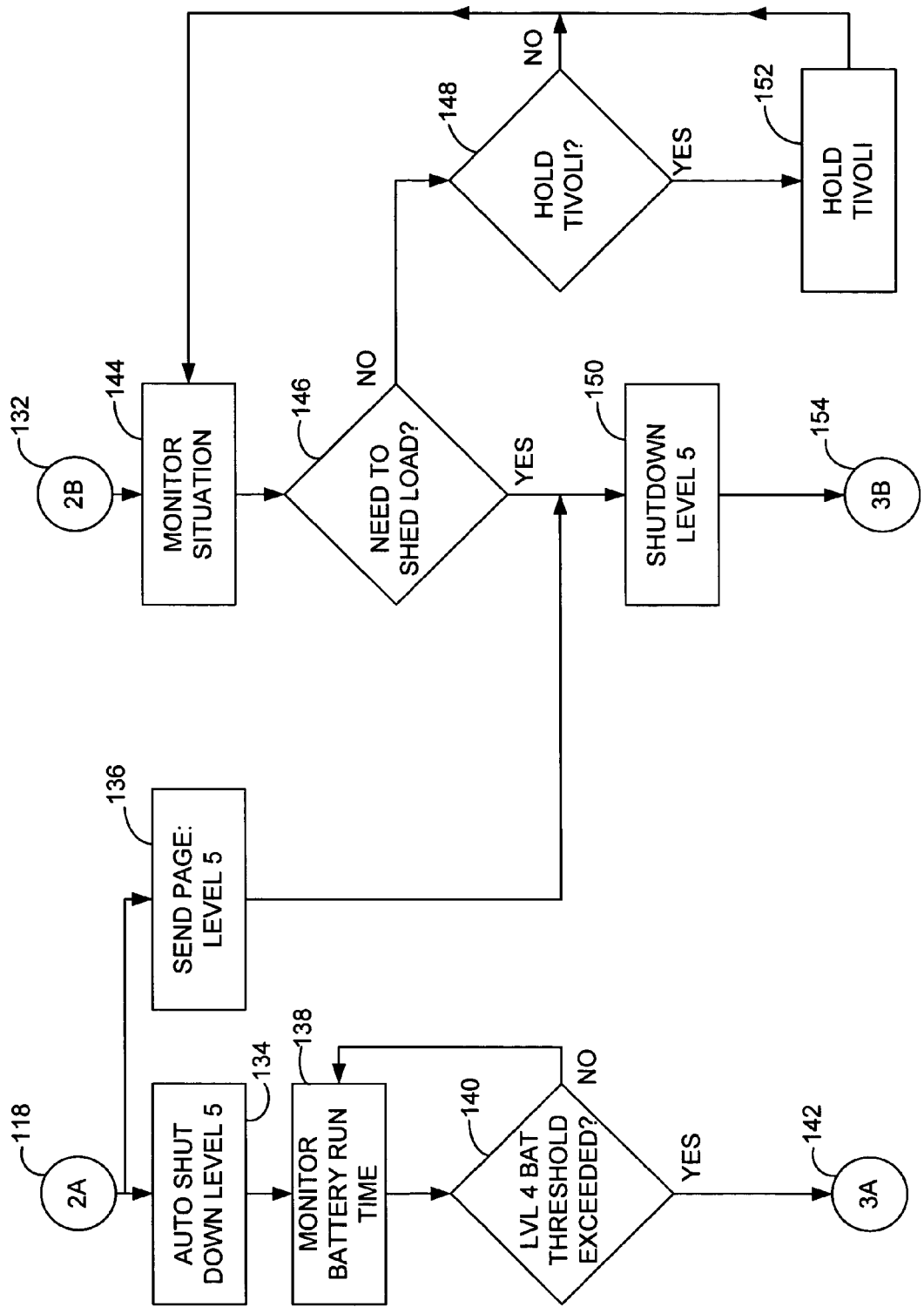

At block 118 on FIG. 6B, it has just been determined that the computing complex is now at load shed level 5. Control passes to block 134, where procedures are begun to automatically shut down level servers having a criticality level of 5. Also, a page is automatically sent to support personnel, notifying them that the computing complex is now at level 5, as shown at block 136. Once again, the remaining run time for the UPS battery is monitored, as shown at block 138. At block 140, the remaining run time for the UPS battery is continuously compared to threshold values contained within the load shedding master table 50 to determine if a level 4 condition yet exists. If not, the monitoring continues at block 112. If a level 4 condition exists, processing continues on FIG. 6C at element 142.

At block 132 on FIG. 6B, information has just been gathered by the emergency response team. At block 144 the emergency response team monitors the current state of the utility failure. Using both information gathered at step 130 in conjunction with additional dynamic information such as the "Estimated Time Up" ETU for the primary power source, the remaining battery run time, and the room temperature, the emergency response team monitors the situation to determine if additional manual intervention is necessary, as shown at block 144. At block 146, it is determined if the emergency response team needs to manually perform any level 5 load shedding operations not yet performed by the automated process. If so, the emergency response team performs a shutdown of level 5 servers, as shown at block 150, and control then passes to block 154 on FIG. 6C. If the emergency response team does not need to manually shed any load, control passes to block 148 where the emergency response team determines whether a manual override of the automatic shutdown procedures currently underway by centralized load shedding manager 16 are necessary (i.e., whether the Tivoli automated procedures need to be put on hold). There are a number of reasons why a manual override of the automated procedures need to be performed. For example, there may be an extraordinary need to provide power to support manufacturing servers for a time critical manufacturing run. In another example, the manufacturing facility may be currently not operating, so their supporting servers will assume a lower priority. If the manual override is not necessary, control passes back to block 144, where the situation continues to be monitored. If a manual override of the automated procedure is necessary, this is done at block 152, and control then passes back to block 144.

Figure 6C:
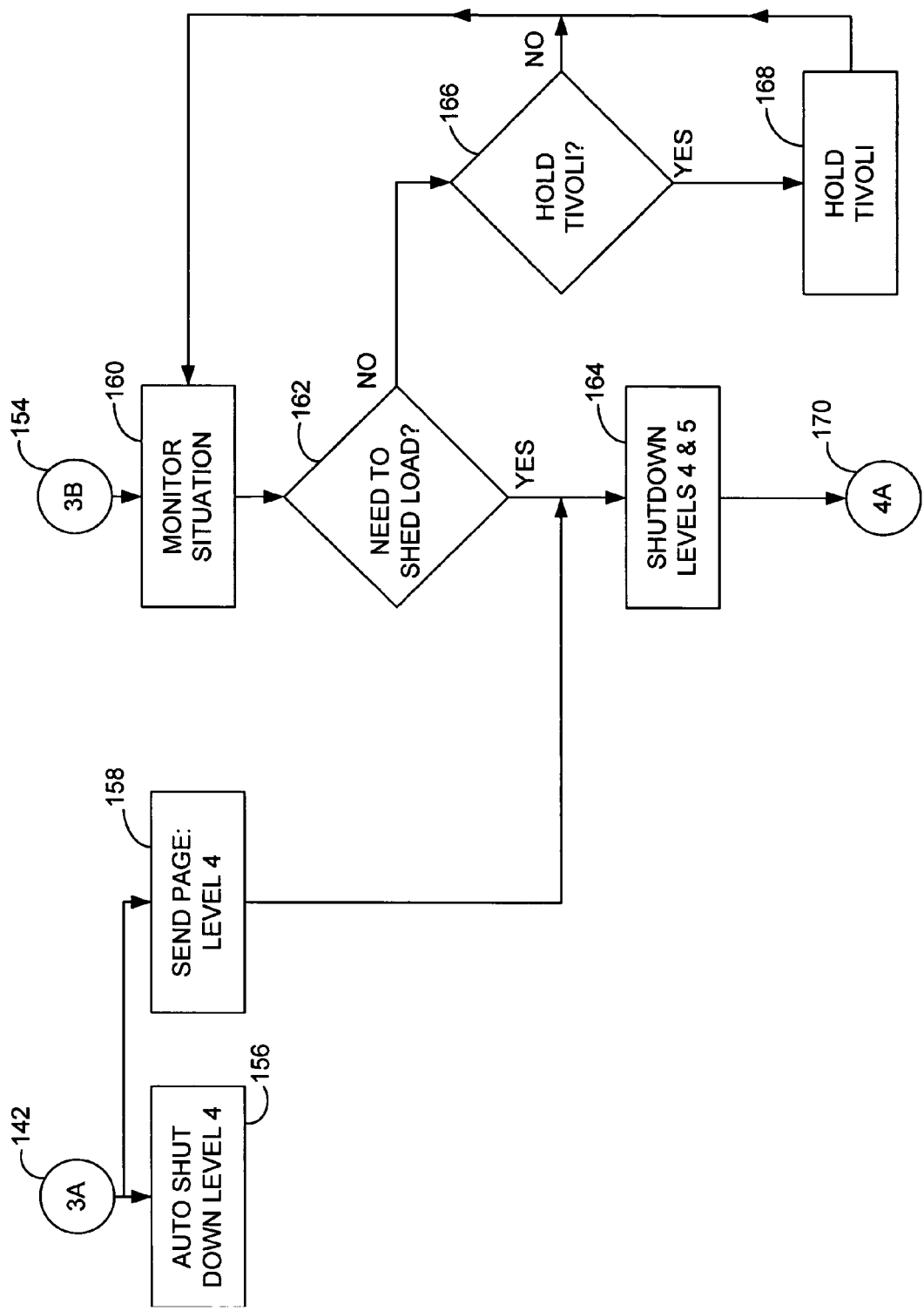

At block 142 of FIG. 6C, it has just been determined that the computing complex is now at load shed category level 4. As a result, automated procedures are begun to shut down level 4 computer servers, as shown at block 156. Also, a page is automatically sent to support personnel, notifying them that the computing complex is now at level 4, as shown at block 158.

At block 154 of FIG. 6C, a manual shutdown has just been performed on selected level 5 servers. At block 160, the emergency response team once again monitors the current state of the utility failure. Using both information gathered at step 130 in conjunction with additional dynamic information such as the "Estimated Time Up" ETU for the primary power source, the remaining battery time, and the room temperature, the emergency response team then monitors the situation to determine if additional manual intervention is necessary. At block 162, it is determined if the emergency response team needs to manually perform any level 4 load shedding operations not yet performed by the automated process. If so, the emergency response team performs a shutdown of level 4 (and possibly any remaining level 5) servers, as shown at block 164, and control then passes to block 170 on FIG. 6D. If the emergency response team does not need to manually shed any load, control passes to block 166 where the emergency response team determines whether a manual override of the automatic shutdown procedures currently underway by centralized load shedding manager 16 are necessary (i.e., whether the Tivoli automated procedures need to be put on hold). If the manual override is not necessary, control passes back to block 160, where the situation continues to be monitored. If a manual override of the automated procedure is necessary, this is done at block 168, and control then passes back to block 160, where the situation continues to be monitored.

Figure 6D:
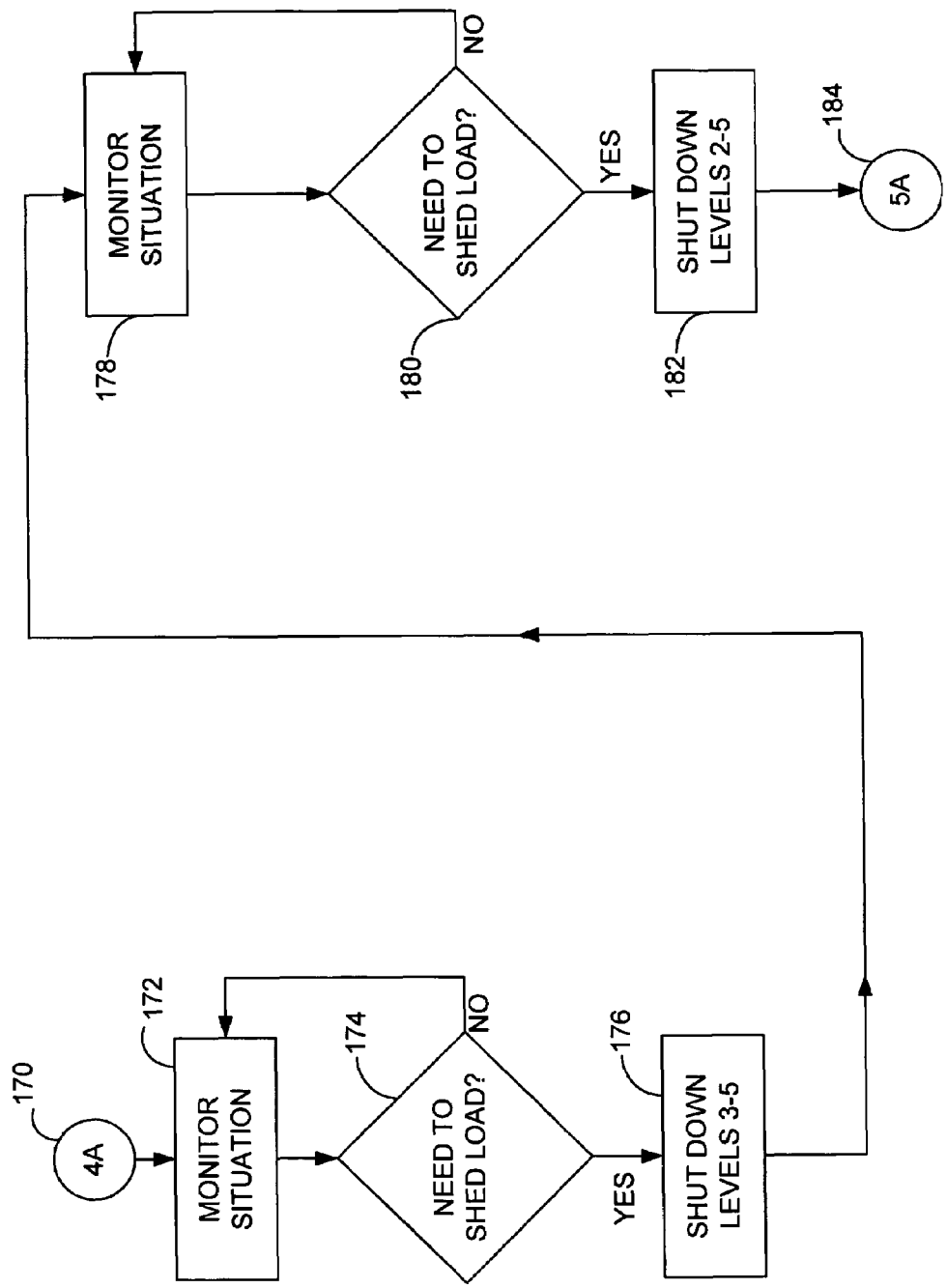
Figure 6E:
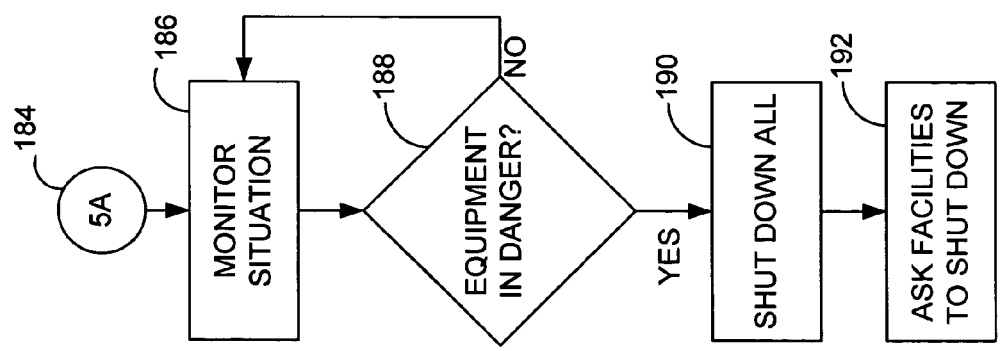

At block 170 of FIG. 6D, a manual shutdown has just been performed of selected level 4 servers. At block 172, the emergency response team once again monitors the current state of the utility failure. Using both information gathered at step 130 in conjunction with additional dynamic information such as the "Estimated Time Up" ETU for the primary power source, the remaining battery run time, and the room temperature, the emergency response team then monitors the situation to determine if additional manual intervention is necessary. At block 174, it is determined if the emergency response team needs to manually perform any level 3 load shedding operations. In the illustrated embodiment, completely automated shutdown procedures are limited to only levels 4 and 5 for safety and reliability reasons. For levels 3, 2 and 1, the shutdown procedures are manually initiated, but automation is utilized to actually perform the server shutdown. However, there is no technical limitation that would prevent a fully automated shutdown of all load shed category levels, and the present invention contemplates that such an embodiment would lie within the scope and spirit of the present invention. If a level 3 manual shut down operation is required, the emergency response team performs a shutdown of level 3 (and possibly any remaining level 4 and 5) servers, as shown at block 176, and control then passes to block 178. If the emergency response team does not need to manually shed any load, control passes to block 172 where the emergency response team continues to monitor the situation.

At block 178, the emergency response team once again monitors the current state of the utility failure. Using both information gathered at step 130 in conjunction with additional dynamic information such as the "Estimated Time Up" ETU for the primary power source, the remaining battery run time, and the room temperature, the emergency response team then monitors the situation to determine if additional manual intervention is necessary. At block 180, it is determined if the emergency response team needs to manually perform any level 2 load shedding operations. If so, the emergency response team performs a shutdown of level 2 (and possibly any remaining level 3, 4 and 5) servers, as shown at block 182, and control then passes to block 184, on FIG. 6E. If the emergency response team does not need to manually shed any load, control passes back to block 178 where the emergency response team continues to monitor the situation.

At block 184 a manual shutdown has just been performed on the level 2-5 servers. At block 186, the emergency response team once again monitors the current state of the utility failure. Using both information gathered at step 130 in conjunction with additional dynamic information such as the "Estimated Time Up" ETU for the primary power source, the remaining battery run time, and the room temperature, the emergency response team then monitors the situation to determine if additional manual intervention is necessary. At block 188, it is determined if any equipment is in imminent danger of losing power or overheating. If so, the emergency response team performs a shutdown of all remaining servers, as shown at block 190. Finally, a request is made to facilities to shut down all operations, as shown at block 192.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A method for managing an operation of a computing complex having one or more computer servers, the method comprising the steps of:

reading a set of control files for determining a current load shed category for the computing complex during a utility outage;

monitoring a plurality of operating environment parameters within the computing complex during the utility outage, wherein the computing complex is powered by at least one battery driven uninterruptible power supply during the utility outage; and selectively powering down one or more of the computer servers based on a current state of at least two of the plurality of operating environment parameters, the current load shed category for the computing complex, and a criticality value pre-assigned to each of the one or more computer servers.

2. The method of claim 1, wherein the one or more operating environment parameters include one or more ambient temperature readings within the computing complex.

3. The method of claim 1, wherein the one or more operating environment parameters include a current time of day.

4. The method of claim 1, wherein the computing complex is powered by at least one battery driven uninterruptible power supply during the utility outage.

5. The method of claim 1, wherein the method further comprises the step of sending pager text messages to a predetermined set of support personnel based on the current state of the plurality of operating environment parameters.

6. The method of claim 1, wherein the utility outage is a power failure within the computing complex.

7. The method of claim 1, wherein the utility outage is a cooling failure within the computing complex.

8. The method of claim 1, wherein the one or more operating environment parameters include remaining battery operating time of the at least one uninterruptible power supply powering the computing complex.

9. An apparatus for managing an operation of a computing complex comprising one or more computer servers, the apparatus comprising:

a set of environment equipment for maintaining an operating environment of the computing complex during a utility outage;

an environment monitor server coupled to the set of environment equipment for monitoring a current state of a plurality of operating environment parameters within the computing complex during the utility outage;

a set of control files for determining a current load shed category for the computing complex; and a centralized load shedding manager coupled to the environment monitor server and the set of control files, the centralized load shedding manager managing the selective powering down of one or more of the computer servers based on the current combined state of two or more of the plurality of environment parameters, the current load shed category for the computing complex and criticality value pre-assigned to each of the one or more computer servers.

10. The apparatus of claim 9, wherein the set of environment equipment includes at least one member chosen from the group consisting of: an uninterruptible power supply (UPS), a power distribution unit (PDU), a static transfer switch (STS), an air handling unit (AHU), and a temperature probe.

11. The apparatus of claim 10, wherein the one or more operating environment parameters include remaining battery operating time of the uninterruptible power supply powering the computing environment.

12. The apparatus of claim 10, wherein the one or more operating environment parameters include one more ambient temperature reading provided by the temperature probe.

13. The apparatus of claim 10, wherein the one or more operating environment parameters include a current time of day.

14. The apparatus of claim 10, wherein the computing environment is powered by the uninterruptible power supply during the utility outage.

15. The apparatus of claim 10, wherein the utility outage is a power failure within the computing complex.

16. The apparatus of claim 10, wherein the utility outage is a cooling failure within the computing complex.

17. The apparatus of claim 9, wherein the set of control files includes a load shedding master table.

18. The apparatus of claim 9, wherein the set of control files includes a load shedding pager table.

19. The apparatus of claim 9, wherein the apparatus further includes one or more pagers coupled to the centralized load shedding manager, wherein the centralized load shedding manager sends pager text messages to one or more pagers based on the current state of the operating environment parameters.

20. The apparatus of claim 9, wherein the environment monitoring server is coupled to the centralized load shedding manager by one or more simple network management protocol (SNMP) traps.

21. A method for deploying computing infrastructure, comprising integrating computer-readable code into a computing complex, wherein the code in combination with the computing complex is capable of providing management of an operation of the computer complex, the method comprising the steps of:

reading a set of control files for determining a current load shed category for the computing complex during a utility outage;

monitoring a plurality of operating environment parameters within the computing complex during the utility outage; and selectively powering down one or more computer servers within the computing complex based on a current state of at least two of the plurality of operating environment parameters, the current load shed category for the computing complex, and a criticality value pre-assigned to each of the one or more computer servers.

* * * * *